Patented Dec. 23, 1947

2,433,267

UNITED STATES PATENT OFFICE

2,433,267

PYRIDINE COMPOUNDS

Wolffe Harry Feinstone, Yonkers, and Harris L. Friedman, New York, N. Y., assignors to Pyridium Corporation, Yonkers, N. Y., a corporation of New York No Drawing. Application July 25, 1945, Serial No. 607,080

4 Claims. (Cl. 260—297)

Our invention relates to, and has for its object, the adaptation of chemical compounds that are useful for devitalizing, rendering harmless or innocuous bacteria, and refers particularly to such compounds as are thus usefully applicable to such bacteria as cause tubercular infections, without limitation however, to that particular bacterium.

We have found that the therapeutically prepared compounds included in my invention have new, useful and unexpected bacteriostatic properties against the bacilli causing tubercular infections.

These compounds show a marked and unexpected activity against Mycobacterium tuberculosis. This action against Mycobacterium tuberculosis is particularly unexpected and remarkable as they are relatively without effect against other pathogenic organisms such as E. coli, Staphylococcus aureus and Streptococcus pyogenes. Substances, which were hitherto known to have activity against Mycobacterium tuberculosis, such as certain sulfonamide and related compounds are greatly, if not completely, inhibited in the presence of biological inhibitory substances, which is known to account for the lack of sufficient in vivo activity of those previously known compounds.

Some of the inhibitory substances which are present in the human organism include para-aminobenzoic acid, serum, peptones, pus and other protein degradation products which have high content of inhibitory substances. These inhibitory substances in the lesions of tuberculosis and other diseases which produce large amounts of tissue breakdown play a very important role in the inhibition of sulfonamide and sulfone compounds. As a result of this inhibitory mechanism, therapeutic trials on the whole failed completely.

The activity of our compounds against Mycobacterium tuberculosis is not diminished, when p-aminobenzoic acid, peptones, serum, pus, etc., are present. We have found that these compounds inhibit the growth of various strains of tuberculosis organisms in various dilutions, some diluted as high as one part to 25 millions, depending upon the medium and strain of tuberculosis organism used.

As the number and the proportions of these inhibitory substances vary in the tubercular host, it is evident that it is impossible to administer a proper amount of the active bacteriostatic compound to accomplish its desired effectiveness, and that, therefore, any compound of this character which would practically retain its bacteriostatic properties irrespective of the inhibitory substances present would be of the highest value.

This property of the compounds, included within our invention, of being practically uninhibited in bacteriostatic effectiveness, and especially in bacteriostatic effect against Myobacterium tuberculosis, is entirely unexpected and cannot be predicated upon any prior knowledge relative to previously known bacteriostatic compounds, and is of the highest importance and value in the treatment of infection.

By "inhibitory substances" in our specification and claims, we mean those substances which prevent the bacteriostatic action normally manifested by compounds in their absence, but which do not inhibit the bacteriostatic activities of the compounds of our invention.

We have found that when adequate precautions are taken to administer these compounds in such a manner and with such frequency as to insure a desired concentration of the respective compounds in the blood stream, they are effective in the treatment of tuberculosis.

The primary object of our invention is to provide chemical compounds, which inhibit the growth, devitalize, or render harmless Mycobacterium tuberculosis with or without the presence of such inhibitory substances as peptones, serum, pus, p-aminobenzoic acid, etc., without limitation to that particular bacterium.

Another object of our invention is to treat animals and human beings, infected with tuberculosis, by administering said compound in segregated doses in such a manner as to insure effective concentration in the blood stream.

The general formula of the compound of our invention is

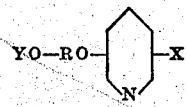

in which X is a member of the group consisting of amino radicals, radicals hydrolyzable to amino radicals and radicals reducible to amino radicals; R is a member of the group of short chain alkyl radicals having not more than two carbon atoms, and Y is a member of a group of alkyl radicals having not more than six carbon atoms. The YO—RO member is preferably in the 2 position and the X member in the 5 position. Changing the respective positions of these two members changes the activity of the compounds.

For the X of the general formula we prefer the amino group of the acylamino group. For acyl groups we may use formyl, acetyl, propionyl, etc., acid radicals.

As the animal or human body has the tendency to acetylate the free amino groups of chemical compounds, we prefer the acetyl group for the acyl group. These acetylated compounds as a rule are somewhat less toxic, but, as expected, their activity is somewhat lessened. On the other hand, the acyl groups may be hydrolyzed in the body to release the more active base. Instead of amino groups we can use compounds with nitro group as they are as a rule reduced to the amino group in the body.

For the YO—RO— group we have prepared and tested compounds with methoxyethoxy-, ethoxyethoxy-, butoxyethoxy-, groups, but it is evident that other alkoxyalkoxy-, compounds could be used.

From among the compounds capable of forming the YO—RO— compounds of the above mentioned formula, we mention ethylene-glycol-monomethylether, ethylene-glycol-monoethylether and ethylene-glycol-monobutylether as examples of the general group which we have found of particular interest.

The following are processes for the production of some of the compounds of our invention:

Example I 5 grams sodium were dissolved in 200 ccs. ethylene-glycol-monomethylether, cooled to room temperature, and 31.8 grams 2-chloro, 5-nitropyridine were added. It was heated to and kept at 90°–100° C. under stirring for 2 hours. After standing over night, the brown colored solution was filtered from the precipitated sodium chloride, and drowned in 500 ccs. water. After cooling, the crystalline precipitate was collected, washed with ice water, and recrystallized from water to which charcoal was added. The white crystalline product is 2-methoxyethoxy, 5-nitro pyridine. 20 grams of this nitro compound were reduced to the amine in 60 ccs. water and 60 ccs. methanol with 40 grams iron filings and 2.5 cc. glacial acetic acid by refluxing under continuous stirring for 6½ hours. After standing over night 60 ccs. methanol and 8 ccs. of 20% solution of sodium hydroxide were added and the mixture filtered. The filter cake was washed well with methanol and the methanol distilled from the filtrate. 5 ccs. of 20% sodium hydroxide solution were added to the filtrate which was then extracted with ether. The ether was distilled off and the residue was vacuum distilled. The free amine, 2-methoxyethoxy, 5-aminopyridine distills at 120°–136° C. and 1.5 mm. The liquid distillate was dissolved in dry ether and the more stable dihydrochloride precipitated with dry hydrochloric acid gas.

Example II 5 grams sodium were dissolved in 200 ccs. ethyleneglycolmonoethylether, cooled to room temperature and 32 grams 2-chloro, 5-nitropyridine were added. The reaction mixture was worked up as in Example I to obtain 2-ethoxyethoxy, 5-nitropyridine, and this was reduced to the free amine 2-ethoxyethoxy, 5-aminopyridine, which boils at 129°–142° C. at 0.8 mm.

Example III 2-butoxyethoxy, 5-nitropyridine was prepared by dissolving 5 grams sodium in 200 ccs. ethyleneglycol-monobutylether and 32 grams 2-chloro, 5-nitropyridine as in Example I, and reduced to the free base as described there. The free base 2-butoxyethoxy, 5-aminopyridine boils at 147°–153° C. and 0.3 mm.

Example IV 3 grams 2-methoxyethoxy, 5-aminopyridine, prepared according to Example I, was dissolved in ether, refluxed with 2 ccs. acetic anhydride and evaporated on the steam bath to an oily residue. A few ccs. of water were added and digested on the steam bath adding sodium bicarbonate little by little until neutral reaction. On evaporation on oily residue was obtained, which became crystalline on cooling. This was dried in a desiccator, pulverized and extracted with acetone. The acetone solution was evaporated and the remaining syrup cooled for crystallization. For purification it was boiled up in methanol with charcoal and evaporated to dryness. The product is 2-methoxyethoxy, 5-acetaminopyridine.

For test organism we have used *Mycobacterium tuberculosis* var. hominis. The tests were conducted both in the absence and in the presence of inhibitory substances like p-aminobenzoic acid, serum, peptones, pus, nicotinic acid, biotin, thiaminechloride and others.

The activity of some of the compounds included in our invention against *Mycobacterium tuberculosis* are tabulated below. The figures indicate the highest dilution that still inhibits the growth of *Mycobacterium tuberculosis*, under a particular set of experimental conditions as regards inoculum, culture, etc., thereby making a comparable series.

| Name of compound | Highest dilution showing bacteriostasis |
| --- | --- |
| 2-methoxyethoxy, 5-aminopyridine | 1/200,000 |
| 2-ethoxyethoxy, 5-aminopyridine | 1/200,000 |
| 2-butoxyethoxy, 5-aminopyridine | 1/25,000 |
| 2-methoxyethoxy, 5-acetaminopyridine | 1/6,250 |
| 2-methoxyethoxy, 5-nitropyridine | 1/25,000 |

These pyridine ethers form an oily liquid or low melting solid, some practically insoluble in water. They are unstable, color up on standing and the decomposition products so formed may be toxic and deleterious, therefore, we used their salts for testing purposes, and propose to use their salts as therapeutic agents. Pyridine, and aromatic amines form additional salts with acid. We prefer to use their hydrochlorides, formed with the addition of hydrochloric acid. But we can also use the additional salts formed with sulfuric, nitric, acetic, lactic, butyric, citric, tartaric, succinic, benzoic, salicyclic and other acids.

The compounds of our invention, therefore, present highly valuable and unexpected bacteriostatic properties especially against such bacteria as cause tubercular infections.

We do not confine ourselves to the specific limitations mentioned, as these are given solely for the purpose of clearly describing our invention as set forth herein.

What we claim is:

1. Compounds having bacteriostatic properties, and having the general formula:

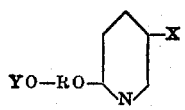

in which X is a nitrogenous member of the group consisting of amino radicals, radicals hydrolyzable to amino radicals and radicals reducible to amino radicals; R is a member of a group of short chain alkyl radicals having not more than 2 carbon atoms and Y is a member of a group of alkyl radicals having not more than 6 carbon atoms, and their salts.

2. Compounds having bacteriostatic properties, and having the formula 2-methoxyethoxy, 5-aminopyridine and its salts.

3. Compounds having bacteriostatic properties, and having the formula 2-ethoxyethoxy, 5-aminopyridine and its salts.

4. Compounds having bacteriostatic properties, and having the formula 2-butoxyethoxy, 5-aminopyridine and its salts.

WOLFFE HARRY FEINSTONE.
HARRIS L. FRIEDMAN.